May 11, 1948.    F. P. METZGER    2,441,434
CAM ACTUATED SWITCH
Filed June 13, 1944    3 Sheets-Sheet 1
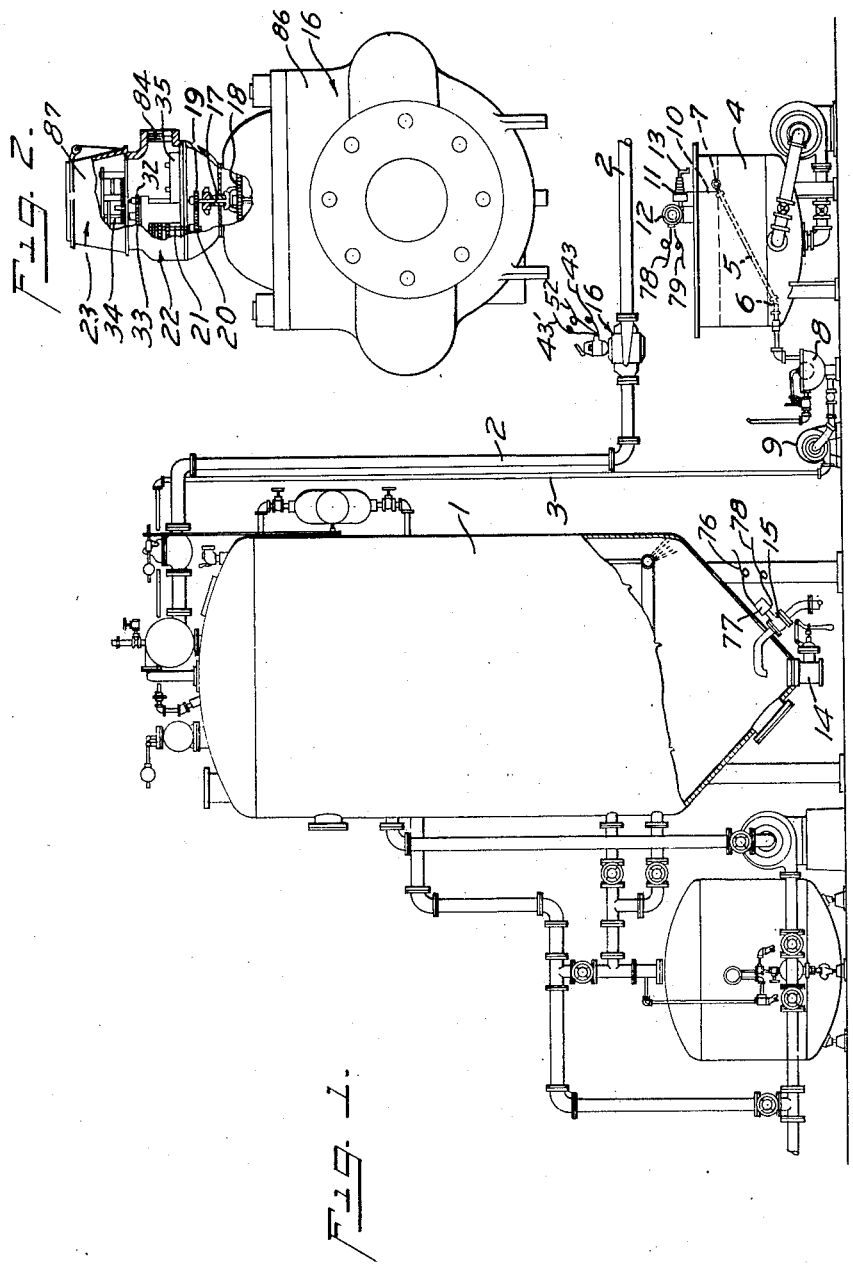
Fredrick P. Metzger
INVENTOR
BY Rohe Meyer
ATTORNEY May 11, 1948.　　F. P. METZGER　　2,441,434
CAM ACTUATED SWITCH
Filed June 13, 1944　　3 Sheets-Sheet 2
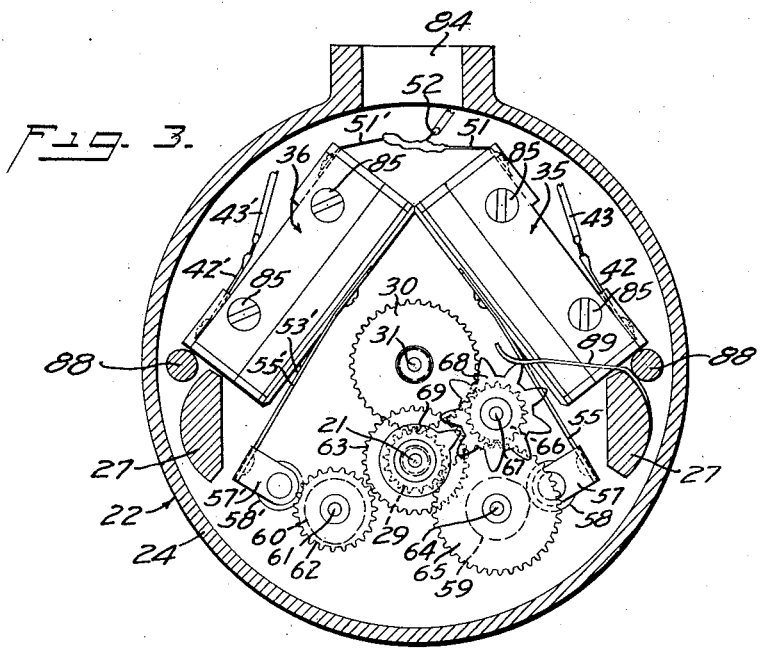
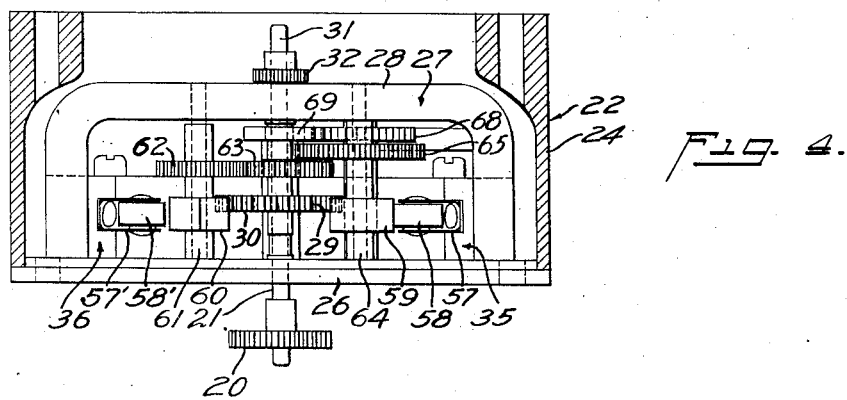
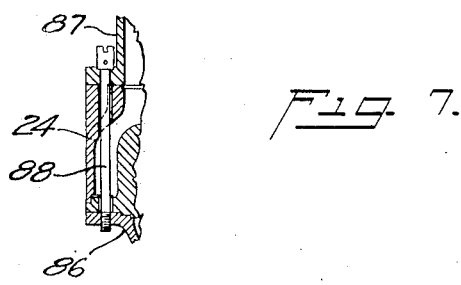
Fredrick P. Metzger
INVENTOR
BY
ATTORNEY

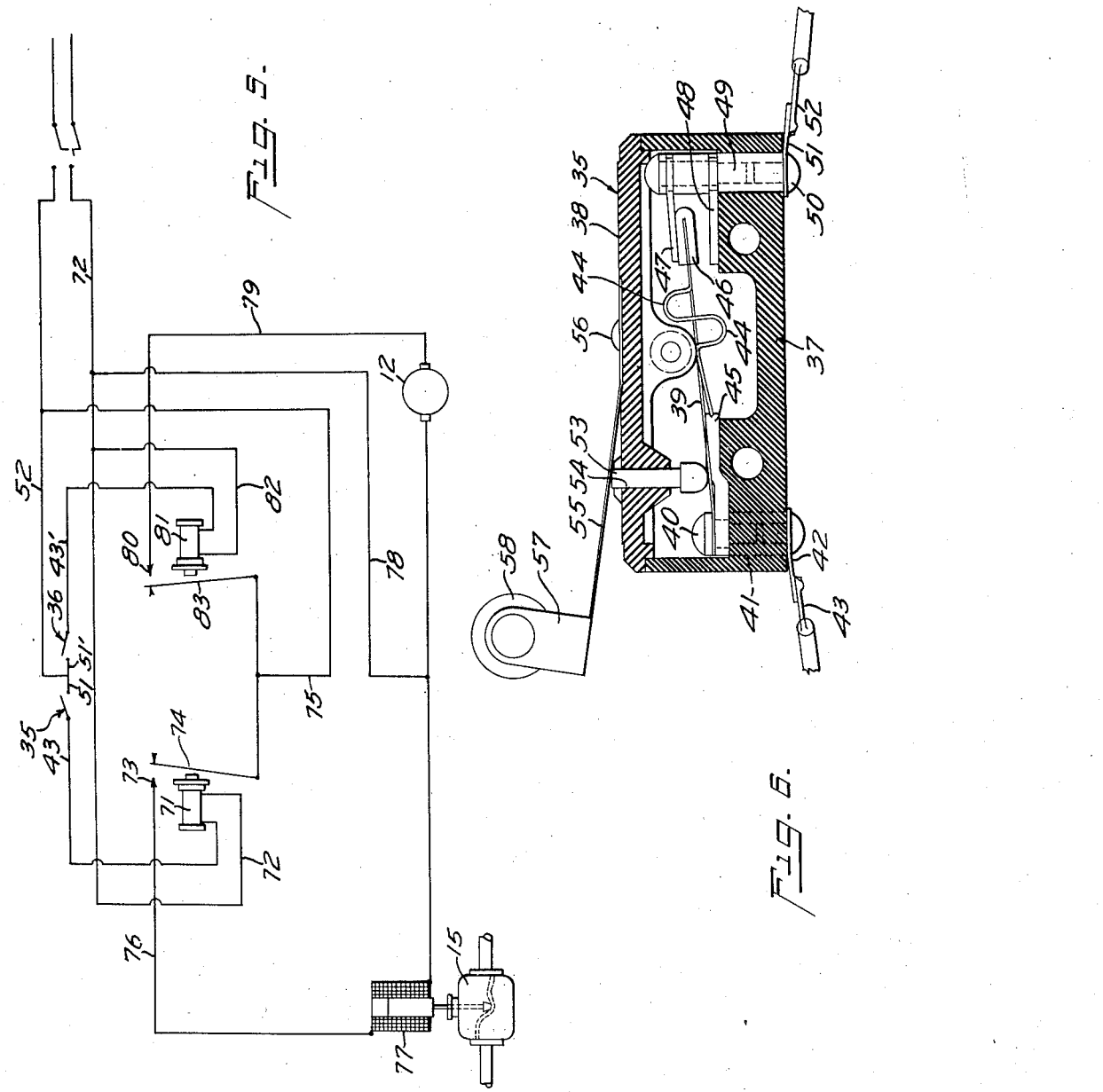

Patented May 11, 1948

2,441,434

UNITED STATES PATENT OFFICE 2,441,434

CAM ACTUATED SWITCH

Fredrick P. Metzger, Newark, N. J., assignor to Worthington-Gamon Meter Company, Newark, N. J., a corporation of New Jersey Application June 13, 1944, Serial No. 540,119

1 Claim. (Cl. 200—27)

This invention relates to the control of individual electric circuits in a multi-circuit system employed in water treating and purifying systems, and more particularly to a meter actuated switch means for opening and closing the individual circuits at predetermined time intervals for controlling auxiliary devices in accordance with the rate of flow of liquid through the meter.

In water treating or precipitating systems wherein chemicals are added to the water for treating purposes, it is common practice to add the chemical to the water intermittently. The raw or untreated water is metered, and a predetermined quantity of chemical is fed to the raw water at intervals based on the passage of a predetermined quantity of raw water through the meter. Electrically actuated devices are employed for controlling the feed of chemical to the raw water, and uniform treatment of the water requires that the chemical liquid be added in volumetric proportion to the raw water.

In the treating process, precipitate or sludge settles in the bottom of the treating tank, the latter usually having a conical bottom. It is common practice to remove the sludge that settles in the bottom of the tank through the medium of a large area quick-opening valve at long intervals of accumulation, or through the medium of an electrically operated proportional sludge removing valve. The first method of removal is objectionable because of its disturbance of the softening process and of the supply of treated water, while the second method is efficient to a degree that practically eliminates the necessity for opening the large blow-off valve. The quantity of sludge settling in the bottom of the tank depends upon the amount of impurities in the water being treated, and in water of approximately constant impurity content, the quantity of sludge is essentially in proportion to the quantity of water treated. It is desirable therefore that the proportional sludge removing valves be so controlled as to provide for frequent small quantity blow-off in proportion to the amount of raw water delivered to the treating apparatus. Efficient treatment of water requires that operations of the foregoing nature be effectively correlated with respect to the rate of flow of raw water. Accordingly, an object of the present invention is to provide a meter actuated switch means for controlling individual operating circuits in a multi-circuit system to the end that the operations may be performed in a correlated and efficient manner based on the quantity of raw water flowing through the meter.

Another object is to provide in a water meter, a novel switch means for controlling individual circuits in a correlated manner based on the flow of water through the meter, and in which the switch means are designed to constitute a unit of simple construction which may easily be incorporated in a conventional meter.

A further object is to provide a switch means for controlling individual circuits in a multi-circuit system, and in which the switch means are of such construction as to facilitate incorporation of the switch means between the gear train and the register of a standard meter, with the switch means constituting a driving connection between the gear train and the register.

A further object is to provide in a water meter, a switch means embodying a plurality of switch units which may be incorporated in the meter to be controlled thereby in accordance with the quantity of water flowing through the meter, and in which novel gear train and cam means are incorporated for operating the respective switch units at predetermined intervals.

With these and other objects in view, as may appear from the accompanying specification, the invention consists of various features of construction and combination of parts, which will be first described in connection with the accompanying drawings, showing a proportioning meter of a preferred form embodying the invention, and the features forming the invention will be specifically pointed out in the claim.

In the drawings:

Figure 1 illustrates an elevational view, partly in section, of a water treating or purifying system embodying the present invention.

Figure 2 is a partial sectional view of a proportioning meter showing the switch means incorporated therein.

Figure 3 is a top plan view of the switch means, with the containing case thereof shown in section.

Figure 4 is a side view of the structure shown in Figure 3, with the containing case shown in section.

Figure 5 is a diagrammatic view of the electrical system controlled by the switch means.

Figure 6 is a sectional view of a switch unit.

Figure 7 is a fragmentary sectional view illustrating a fastening means for the switch means.

Referring more particularly to the drawings, Figure 1 illustrates a water treating system of the hot process type, wherein the water being purified or treated is also heated and deaerated so as to remove gaseous impurities in addition to impurities in the nature of solid matter. This system employs a treating or precipitating tank 1, into the top of which raw or untreated water is delivered by means of an inlet pipe 2. A suitable chemical reagent is introduced into the tank 1 through an inlet pipe 3, the quantity of chemical reagent being controlled by a mixing tank and proportioning apparatus indicated generally at 4. This apparatus includes a decanting tube 5 mounted inside the tank of the apparatus and pivotally supported by a swivel joint 6 at its discharge end. The inlet end 7 of the decanting tube 5 is so located that it will skim the reagent from the top of the body of reagent in the tank. The dispensing of the reagent from the tank 4 is controlled by lowering the decanting tube 5, the dispensed reagent being deposited in a chemical dilution box 8 having communication with a pump 9 for pumping the reagent through the pipe 3.

To the decanting tube 5 is connected a line or cable 10 which is operated by a motor 12. The motor 12 operates in a direction for rotating the drum 11 to unwind the line 10 and lower the decanting tube 5 a predetermined distance, but the line is rewound on the drum 11 manually by a crank 13. The tank 1 is provided with a quick opening sludge valve 14 and an automatic proportional sludge removing valve 15, both of which are located at the bottom of the treating tank, and the latter of which is electrically operated. A proportioning meter 16 is interposed in the raw water inlet pipe 2 for measuring the quantity of raw water flowing to the treating tank 1. The structure so far described is old, the present invention being concerned with an electric circuit and switch means for controlling the motor 12 and the valve 15 in accordance with the quantity of raw water flowing through the meter 16.

In Figure 2, the proportioning meter 16 includes a spindle 17 which is driven by a gear 18, the latter comprising one gear of the usual gear train (not shown) with which such meters are provided. To the upper end of the spindle 17 is attached a speed change gear 19 having mesh with a speed change gear 20 attached to a spindle 21 of a switch means 22 interposed between the gear train of the meter 16 and its register 23, the latter being of conventional construction.

Figures 3, 4, and 6 illustrate the construction of the switch means 22. The switch means 22 include a casing part 24 and a bottom plate or base 26 adjacent which is located the speed change gear 20, and through which the spindle 21 projects. A generally U-shaped bracket 27 is formed integrally with the base 26, the spindle 21 being journaled in both the base and the wall portion 28 of the bracket 27. A pinion 29 is keyed to the shaft 21 and meshes with a gear 30 keyed to a spindle 31 also journaled in both the base 26 and the wall 28. The spindle 31 extends some distance upwardly from the wall 28 and has a speed change gear 32 fixed thereto. This speed change gear meshes with a speed change gear 33 (see Figure 2) attached to a drive spindle 34 of the register 23. Thus the gear train of the meter 16 is drivingly connected with the register 23 through the gear 18, spindle 17, gears 19 and 20, spindle 21, gears 29 and 30, spindle 31, and gears 32 and 33.

The base 26 serves as a mount for two switch units 35 and 36, both of which are operatively incorporated in the switch means 22 and control the operating circuits for the proportional sludge removing valve 15 and the motor 12, respectively. The switch units 35 and 36 are of the same construction, the units being preferably of the type shown in Patent No. 1,960,020, issued May 22, 1934. Figure 6 illustrates the general construction of the unit 35, which unit comprises a hollow insulating body 37 and an insulating cover 38 sealed thereto. Within the housing structure of the unit 35 is mounted a resilient contact element 39 in the nature of a leaf spring. One end of the contact element is made secure to the body 37 by a screw 40 threaded into a conductor sleeve 41 to which a terminal clip 42 is electrically connected, this clip being in turn attached to a circuit wire 43.

Bowed and tensioned arms 44 are formed integrally with the contact element 39 and have end abutment with a spaced body 45. To the free end of the contact element 39 is attached a contact head 46 which lies between two contact stops 47 and 48. The contact stop 48 is electrically connected with a sleeve 49 into which a terminal screw 50 is threaded to anchor a terminal clip 51 electrically connected with a circuit or line wire 52.

The contact element 39 is normally positioned in the manner of Figure 6, at which time the contact head 46 lies in engagement with the stop 47. The circuit wires 43 and 52 may be electrically connected by moving the contact element 39 downwardly to bring the head 46 into engagement with the stop 48. The contact element 39 and its spring arms 44 are so devised as to move the contact element with a snap action to either its normal or circuit closing position. A slight downward movement of the contact element from the position of Figure 6 causes the element to snap into engagement with the contact 48, while a release of pressure from the contact element permits the latter to snap back to its normal position. Means for depressing the contact arm comprises a pin 53 which slides freely in a bore 54 in the cover 38. One end of the pin extends sufficiently far beyond the cover 38 to be engaged by a flexible actuating arm 55 which has one end fixed to the cover 38 by a screw 56. To the free end of the arm 55 is connected a U-shaped bracket 57 in which is mounted a roller 58. Since the units 35 and 36 are identical, similar but primed reference characters are applied to the corresponding parts of the unit 36.

Means for flexing the arms 55 and 55' to close the switch units 35 and 36, respectively, comprise cams 59 and 60. The cam 60 is attached to a spindle 61 journaled in the base 26 and the wall 28, the spindle being rotated by a gear 62 fixed to this spindle and meshing with a gear 63 keyed to the spindle 21. The cam 60 moves the arm 55' sufficiently far to depress the pin 53' to close the switch unit 36, the switch unit being closed once for each rotation of the spindle 61.

The cam 59 is fixed to a spindle 64 rotatably journaled in the base 26 and the wall 28. To the spindle 64 is attached a large gear 65 which meshes with a pinion 66 keyed to a spindle 67, the latter being journaled in the base 26 and the wall 28. Upon the spindle 67 is attached a gear 68 which is rotated intermittently one tooth at a time through the medium of a one tooth pinion 69 attached to the shaft 21. It will thus be seen that the switch units 35 and 36 are closed at different intervals, since the cams 59 and 60 rotate at different but predetermined speeds in proportion to the rate of flow of liquid through the meter 16. The intervals between the respective switch closing operations are dependent upon the quantity measured by the meter 16 and can be regulated by the rate of flow. In addition, speed change gears of ratios differing from the gears 19 and 20 may be employed. The frequency of the time intervals will, of course, depend upon local operating conditions, as well as upon the specific work to be performed by the individual operating circuits controlled by the switch units, since it is obvious that local conditions will vary and that the switch units may control individual operating circuits performing work other than that shown and described.

Figure 5 illustrates the electric circuit system as a whole. The terminal clips 51 and 51' are electrically connected with the common line wire 52. The wire 43 connects with a retarded or time delay relay 71, this relay being electrically connected with the second line wire 72. A fixed contact 73 is associated with the relay 71, which contact is engaged by an armature 74 upon energization of the relay. This armature is electrically connected with a wire 75 attached to the wire 52, and the contact 73 is connected with a wire 76 leading to a solenoid 77 which operates the proportional sludge removing valve 15. The solenoid 77 is connected with the line wire 72 by a wire 78.

Upon closing of the switch 35, the circuit is closed through the relay 71 from the line wire 52 to the wires 43 and 72. Upon energization of the relay, the armature 74 is attracted and brought into engagement with the fixed contact 73. This will close the circuit through the solenoid 77 as follows: Line wire 52, wire 75, armature 74, wire 76, solenoid 77, wire 78, and line wire 72. Energization of the solenoid 77 opens the valve 15 to release sludge from the bottom of the treating tank 1. Thus the solenoid 77 is energized only upon energization of the relay 71, and the valve 15 remains open for a period of time determined by the time delay action of the relay. Thus the meter operated switch 35 determines the energization intervals of the relay 71, and the latter opens the valve 15 at corresponding intervals and determines the length of time that the valve remains open. Since the settled precipitate, or sludge, is deposited in the bottom of the tank 1 in proportion to the impurities in the raw water, the valve 15 is operated to provide frequent small quantity blow-off of sludge in proportion to the amount of raw water delivered to the water treating apparatus.

The motor 12 is electrically connected with the wire 78 and with a wire 79 connected with a fixed contact 80. This contact is associated with a second retarded or time delay relay 81 which is electrically connected with the wire 43' and with a second wire 82 connected with the line wire 72. An armature 83 associated with the relay 81 is electrically connected with the wire 75. Thus current is supplied to the motor 12 when the switch unit 36 is closed for energizing the relay 81. Upon energization of the relay 81, current is supplied to the motor 12 as follows: Wire 75, armature 83, contact 80, wire 79, wire 78, and line wire 72. The motor operates for a period of time determined by the time delay action of the relay 81. Accordingly, the meter operated switch 36 determines the energization intervals of the relay 81, and the latter closes the circuit to the motor 12 at corresponding intervals and determines the duration of motor operation. During each period of motor operation, the decanting tube 5 is lowered a distance proportional to the amount of raw water flowing to the treating apparatus. Thus the switch units 35 and 36 determine the frequency of energization of their respective operating circuits, and the relays 71 and 81 comprise electromagnetic switch means which determine the duration of energization of the respective operating circuits.

The means 22 comprises a small unit which may easily be installed between the gear train of the meter and its register, so that all these parts are incorporated in a single housing structure. Both switch units 35 and 36 and the register are operatively connected with a single meter driven element or driver, namely, the spindle 17. No alteration of the meter gear train or the register is necessary. The switch means 22 is merely interposed between the gear train and the register, with the gears 19 and 20 connecting the meter gear train with the switch means 22 and the gears 32 and 33 connecting the switch means 22 with the register. The one tooth gear 69 provides the necessary speed reduction for the switch unit 35, the closing operations of this unit occurring at relatively long intervals as compared to the frequency of the closing intervals of the switch unit 36.

An opening 84 is provided in the casing part 24 for the passage of the wires 43, 43', and 52. Both switch units 35 and 36 are fastened to the base 26 by screws 85. Figure 7 illustrates the manner in which the casing part 24 is clamped between the meter housing part 86 and the housing part 87 of the register 23, all the parts being detachably connected by two bolts 88, the arrangement thereof being shown in Figures 3 and 4.

The gear 68 is restrained from accidental rotation by a spring 89 which is attached to the bracket 27, which spring yields easily to permit turning of the gear when engaged by the one tooth of the gear 69.

While the present invention is illustrated and described in association with a water treating apparatus, the invention is equally well adapted for use in other fluid circuits wherein a proportioning meter of the foregoing type is employed in a primary flow line, such as the pipe 2, for actuating switches which control operating circuits employed for operating auxiliary flow regulating devices, such as the sludge removing and chemical feeding features in the instant case, all in accordance with the rate of flow through the primary line.

It will be understood that the invention is not to be limited to the specific construction or arrangement of parts shown, but that they may be widely modified within the invention defined by the claim.

What is claimed is:

In a conventional proportioning fluid meter having a separable register for indicating the quantity flow of fluid through the meter and fluid actuated means for operating said register; an integral switch mechanism for controlling electrical circuits in accordance with the quantity flow of fluid through the meter, said switch mechanism having a housing with a base plate, two electrical switch units mounted on said plate, first, second, and third spindles, and first and second cam spindles mounted on said plate, said first spindle being driven by the fluid actuating means, said second spindle being geared to and driven by the first spindle and driving the register, said third spindle having a gear intermittently driven by an intermittenly toothed pinion on the first spindle, said first cam spindle having a first cam and being geared to and driven by the third spindle, said first cam operating the first switch, said second cam spindle having a second cam and being geared to and driven by the first spindle, said second cam operating the second switch whereby said first and second switches are operated through said first spindle by the quantity flow of fluid through the meter at diverse intervals relative to each other, said housing being constructed and arranged so as to be capable of rigid connection on one end to the register and on the opposite end to the meter and being conformed to provide when so connected a substantially unitary and contiguous structure with the meter and register.

FREDRICK P. METZGER.

REFERENCES CITED

The following references are of record in the file of this patent:

UNITED STATES PATENTS

| Number | Name | Date |
|---|---|---|
| 24,757 | Richards et al. | July 12, 1859 |
| 262,355 | Bereuter | Aug. 8, 1882 |
| 1,617,406 | Marden | Feb. 15, 1927 |
| 1,643,852 | Linstow | Sept. 27, 1927 |
| 1,720,706 | Winton | July 16, 1929 |
| 1,825,575 | Bryce | Sept. 29, 1931 |
| 1,900,143 | Wallace | Mar. 7, 1933 |
| 1,971,338 | Contant | Aug. 28, 1934 |
| 2,021,248 | Waugh | Nov. 19, 1935 |
| 2,085,224 | Krueger | June 29, 1937 |
| 2,240,182 | Guldner, Jr., et al. | Apr. 29, 1941 |
| 2,319,432 | Panissidi | May 18, 1943 |
| 2,355,561 | Robinson | Aug. 8, 1944 |
| 2,365,298 | Sebald et al. | Dec. 19, 1944 |

FOREIGN PATENTS

| Number | Country | Date |
|---|---|---|
| 3,682 | Great Britain | 1896 |
| 367,453 | Great Britain | Feb. 22, 1932 |